United States Patent
Moon et al.

(10) Patent No.: US 7,181,216 B2
(45) Date of Patent: Feb. 20, 2007

(54) RADIO NETWORK CONTROLLER AND RADIO COMMUNICATIONS METHOD

(75) Inventors: Sung Uk Moon, Yokosuka (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/902,012

(22) Filed: Jul. 30, 2004

(65) Prior Publication Data

US 2005/0026613 A1 Feb. 3, 2005

(30) Foreign Application Priority Data

Jul. 31, 2003 (JP) .............................. 2003-204843

(51) Int. Cl.
*H04Q 7/20* (2006.01)
(52) U.S. Cl. .................................. 455/435.1; 455/456.1
(58) Field of Classification Search ............ 455/435.1, 455/422.1, 502, 503
See application file for complete search history.

(56) References Cited

U.S. PATENT DOCUMENTS

2004/0162071 A1 * 8/2004 Grilli et al. .............. 455/435.1

2005/0143070 A1 * 6/2005 Sinnarajah et al. ...... 455/435.1

FOREIGN PATENT DOCUMENTS

| JP | 2001-203634 | 7/2001 |
|----|-------------|--------|
| JP | 2002-164843 | 6/2002 |
| JP | 2002-259807 | 9/2002 |

* cited by examiner

*Primary Examiner*—Temica Beamer
(74) *Attorney, Agent, or Firm*—Oblon, Spivak, McClelland, Maier & Neustadt, P.C.

(57) ABSTRACT

A radio network controller controls a location registration area which is formed by a plurality of cells. The radio network controller includes a location registration information receiver configured to receive a location registration information for registering a mobile station in the location registration area; a reception capability acquirer configured to acquire a reception capability of the mobile station; and a measurer configured to measure the number of the mobile stations capable of receiving broadcast data or multicast data in the location registration area, in accordance with the location registration information and the reception capability.

4 Claims, 6 Drawing Sheets

RADIO NETWORK CONTROLLER AND RADIO COMMUNICATIONS METHOD

CROSS REFERENCE TO RELATED APPLICATION

This application is based upon and claims the benefit of priority from the prior Japanese Patent Application No. P2003-204843, filed on Jul. 31, 2003; the entire contents of which are incorporated herein by reference.

BACKGROUND OF THE INVENTION

1. Field of the Invention

The present invention relates to a radio communications method for communicating between a radio network controller which controls a location registration area which is formed by a plurality of cells and a mobile station located in the location registration area, and a radio network controller used in the radio communications method.

2. Description of the Related Art

In a radio communications system, network always needs to grasp location information of mobile stations which moves spatially, so as to automatically connect with the mobile stations.

Figure 1:
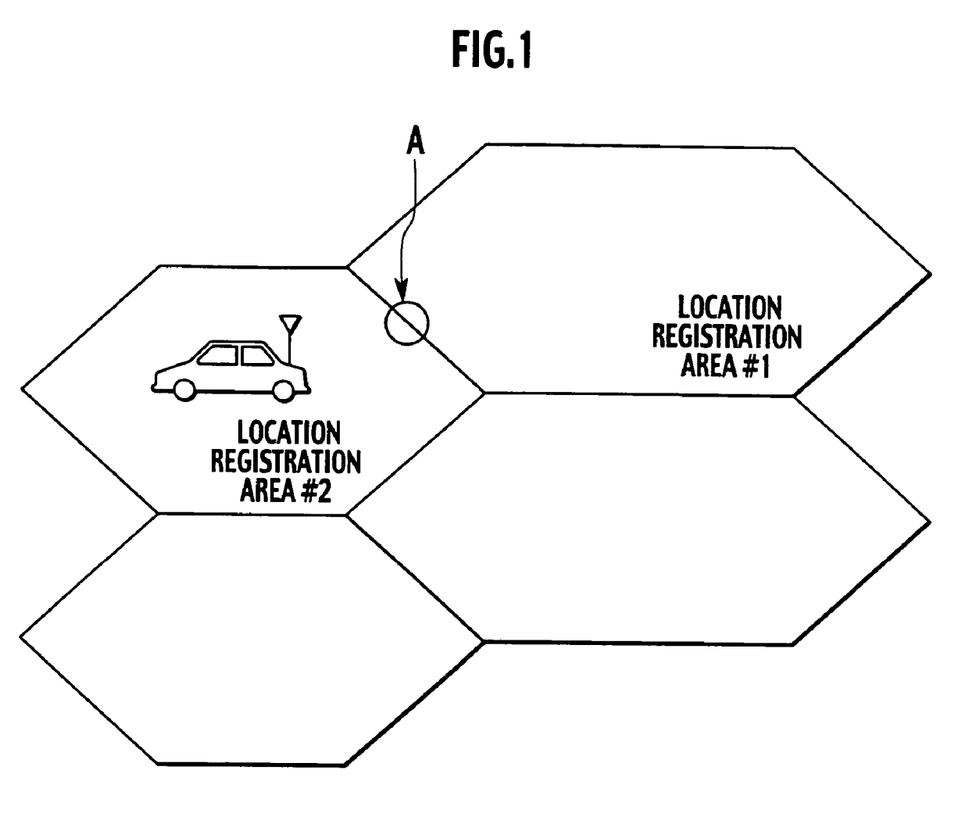
FIG. 1 is a diagram for explaining location registration in the conventional radio communications system.

Therefore, as shown in FIG. 1, the mobile station is configured to register the location information of the mobile station in the network in units of a location registration area which is formed by a plurality of cells.

To be more specific, when the mobile station detects that a location registration area where the mobile station is located changes (referring to a point "A" in FIG. 1), in accordance with a signal from a base station, the mobile station updates the location information registered in itself, and notifies the update to the network.

When power of the mobile station is turned on, the mobile station checks the location information registered in itself in accordance with the signal from the base station again. When the location registration area has changed where the mobile station is located, the mobile station registers new location information in the network.

However, there is a problem in that the conventional radio communications system does not have a means for measuring the number of the mobile stations capable of receiving broadcast data or multicast data, in a broadcast transmission system or a multicast transmission system which transmits same information to a plurality of mobile stations.

BRIEF SUMMARY OF THE INVENTION

In viewing of the foregoing, it is an object of the present invention to provide a radio communications method and a radio network controller which measure the number of the mobile stations capable of receiving broadcast data or multicast data, so as to provide services according to the number of the mobile stations.

A first aspect of the present invention is summarized as a radio network controller which controls a location registration area which is formed by a plurality of cells. The radio network controller includes a location registration information receiver configured to receive a location registration information for registering a mobile station in the location registration area; a reception capability acquirer configured to acquire a reception capability of the mobile station; and a measurer configured to measure the number of the mobile stations capable of receiving broadcast data or multicast data in the location registration area, in accordance with the location registration information and the reception capability.

A second aspect of the present invention is summarized as a radio network controller which controls a location registration area which is formed by a plurality of cells. The radio network controller includes a location registration information receiver configured to receive a location registration information for registering a mobile station in the location registration area; and a measurer configured to measure the number of the mobile stations capable of receiving broadcast data or multicast data in the location registration area, in accordance with the location registration information.

A third aspect of the present invention is summarized as a radio communications method for communicating between a radio network controller which controls a location registration area and a mobile station located in the location registration area. The location registration area is formed by a plurality of cells. The method includes transmitting, at the mobile station, a location registration information for registering the mobile station in the location registration area, at a predetermined timing; acquiring, at the radio network controller, a reception capability of the mobile station; and measuring, at the radio network controller, the number of the mobile stations capable of receiving broadcast data or multicast data in the location registration area, in accordance with the location registration information and the reception capability.

A fourth aspect of the present invention is summarized as a radio communications method for communicating between a radio network controller which controls a location registration area and a mobile station located in the location registration area. The location registration area is formed by a plurality of cells. The method includes transmitting, at the mobile station, a location registration information for registering the mobile station in the location registration area, at a predetermined timing; and measuring, at the radio network controller, the number of the mobile stations capable of receiving broadcast data or multicast data in the location registration area, in accordance with the location registration information.

DETAILED DESCRIPTION OF THE INVENTION

<A Configuration of a Radio Communications System According to a First Embodiment of the Present Invention>

Figure 2:
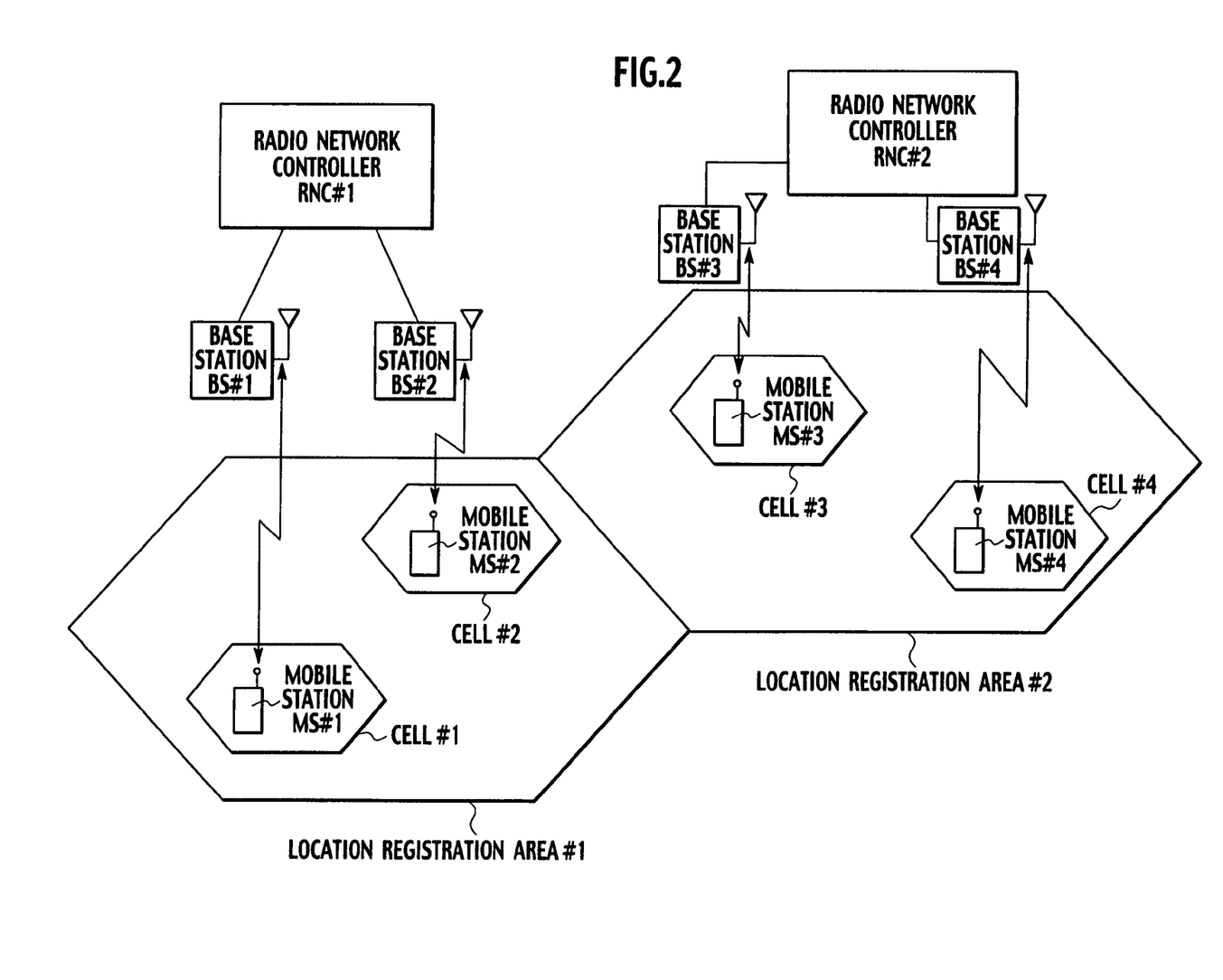
FIG. 2 is a diagram showing the entire configuration of a radio communications system according to a first embodiment and a second embodiment of the present invention.
Figure 3:
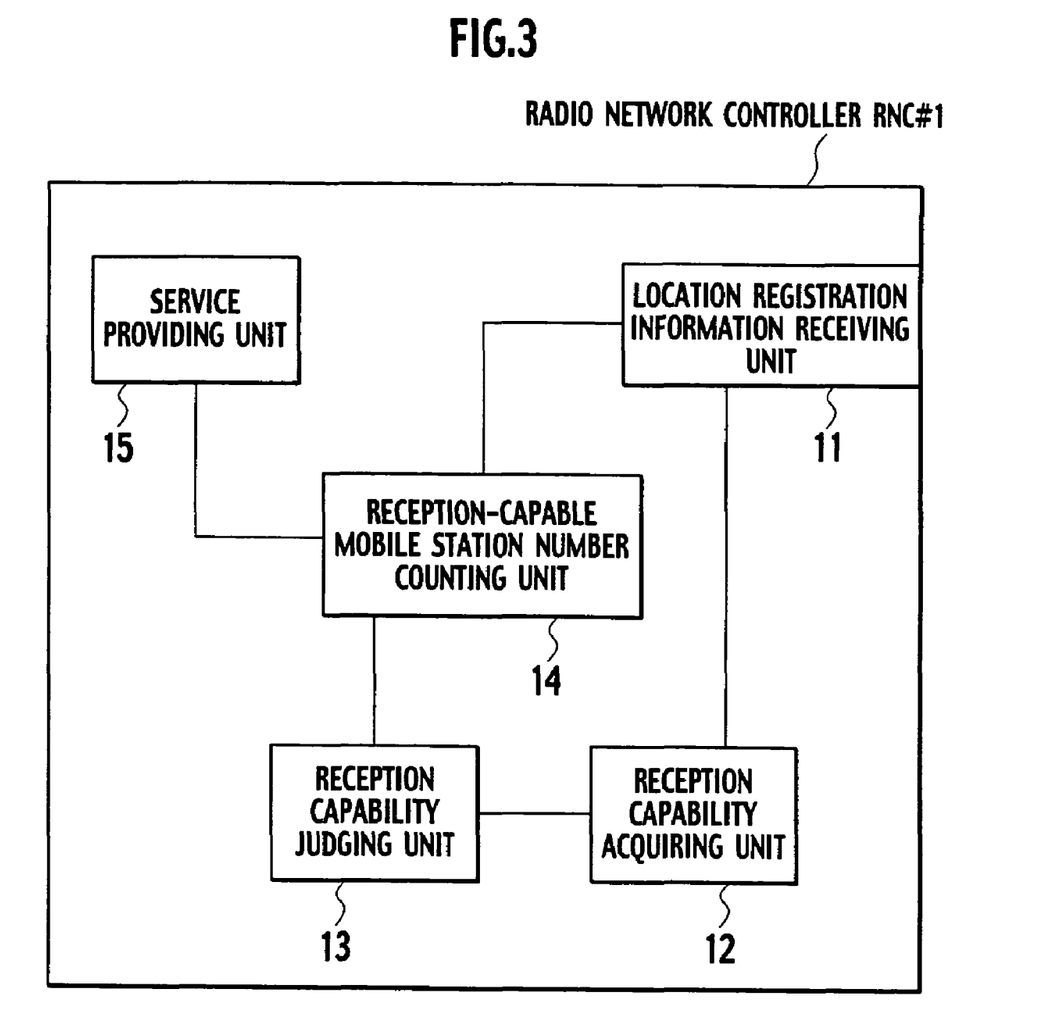
FIG. 3 is a functional block diagram of a radio network controller according to the first embodiment.

Referring to FIGS. 2 and 3, the configuration of a radio communications system according to a first embodiment of the present invention will be described.

The radio communications system according to the first embodiment is configured to provide the MBMS in which the radio network controller RNC transmits broadcast data and multicast data to mobile stations MSs belonging to a predetermined group, by using broadcast channels.

As shown in FIG. 2, the radio communications system according to the first embodiment includes a plurality of radio network controllers RNSs and a plurality of base stations BSs.

Each radio network controller RNS is configured to control a location registration area which is formed by a plurality of cells. Each base station BS is configured to control a cell.

In the first embodiment, mobile stations MS #1 and #2 exist under control of a radio network controller RNS #1 which controls a location registration area #1, and mobile stations MS #3 and #4 exist under control of a radio network controller RNS #2 which controls a location registration area #2.

FIG. 3 shows functional blocks of the radio network controller RNC which is one element of the radio communications system.

Since the configurations of the radio network controllers RNC #1 and #2 are same, hereinafter, the radio network controller RNC #1 will be described.

As shown in FIG. 3, the radio network controller RNC #1 includes a location registration information receiving unit 11, a reception capability acquiring unit 12, a reception capability judging unit 13, a reception-capable mobile station number counting unit 14, and a service providing unit 15.

The location registration information receiving unit 11 is configured to receive a location registration information for registering the mobile stations MS #1 and #2 in the location registration area #1.

The location registration information receiving unit 11 can receive a first location registration information or a second location registration information, as the location registration information.

Here, the first location registration information is transmitted to a core network, when power of the mobile stations MS #1 and #2 are turned on, or when the mobile stations MS #1 and #2 enter the location registration area #1.

The second location registration information is transmitted to the radio network controller RNC #1, so that the mobile stations MS #1 and #2 perform functions of the present invention.

The reception capability acquiring unit 12 is configured to acquire reception capabilities of the mobile stations MS #1 and #2.

For example, the reception capability acquiring unit 12 can acquire a type of an application installed in the mobile station MS #1 or #2, a type of a service to which the mobile station MS #1 or #2 subscribes, a radio communication speed (capacity of a memory capable of receiving data transmitted at the radio communication speed), a type of a CODEC, a coding scheme, a decoding scheme and the like, as the reception capability.

The reception capability acquiring unit 12 can be configured to extract the reception capability of the mobile station MS form the location registration information received by the location registration information receiving unit 11.

The reception capability acquiring unit 12 can be configured to receive the reception capability of the mobile station MS separately from the location registration information received by the location registration information receiving unit 11.

For example, the reception capability acquiring unit 12 can be configured to receive the reception capability of the mobile station MS via an RRC connection request. The RRC connection request is used for setting up an RRC (Radio Resource Control) connection between the mobile station MS and the radio network controller RNC.

Alternatively, the reception capability acquiring unit 12 can be configured to receive the reception capability of the mobile station MS by using a predetermined signaling process.

The reception capability judging unit 13 is configured to judge whether the mobile station MS can receive broadcast data or multicast data or not, in accordance with the reception capability of the mobiles station MS acquired by the reception capability acquiring unit 12.

For example, the reception capability judging unit 13 can judge that the broadcast data or the multicast data can be received by a mobile station MS in which a predetermined application is installed, a mobile station MS which subscribes to a predetermined service, or a mobile station MS which supports a radio communication speed more than or equal to a predetermined speed.

The reception-capable mobile station number counting unit 14 is configured to measure the number of the mobile stations MSs capable of receiving broadcast data or multicast data (hereinafter the reception-capable mobile station number) in the location registration area #1, in accordance with the location registration information received by the location registration information receiving unit 11 and the reception capability received by the reception capability acquiring unit 12.

In the first embodiment, assuming that the mobile station MS #1 can receive the multicast data, and the mobile station MS #2 can receive neither the broadcast data nor the multicast data, the number of the mobile stations MSs capable of receiving broadcast data or multicast data is "1".

The service providing unit 15 is configured to provide a predetermined service with the mobile stations MSs located in the location registration area #1, in accordance with the reception-capable mobile station number measured by the reception-capable mobile station number counting unit 14.

For example, the service providing unit 15 can determine to transmit the broadcast data or the multicast data using dedicated channels, to transmit the broadcast data or the multicast data using common channels, or not to transmit the broadcast data or the multicast data, in accordance with the reception-capable mobile station number measured by the reception-capable mobile station number counting unit 14.

For example, the service providing unit 15 can transmit the broadcast data or the multicast data using the dedicated channels, when the reception-capable mobile station number is more than a first predetermined number. The service providing unit 15 can transmit the broadcast data or the multicast data using the common channels, when the reception-capable mobile station number is less than or equal to the first predetermined number.

Furthermore, the service providing unit 15 can be configured not to transmit neither the broadcast data nor the multicast data, when the reception-capable mobile station number is less than or equal to a second predetermined number.

The service providing unit 15 can broadcast a predetermined information, when the reception-capable mobile station number is more than the first predetermined number.

<An Operation of the Radio Communications System According to the First Embodiment>

Figure 4:
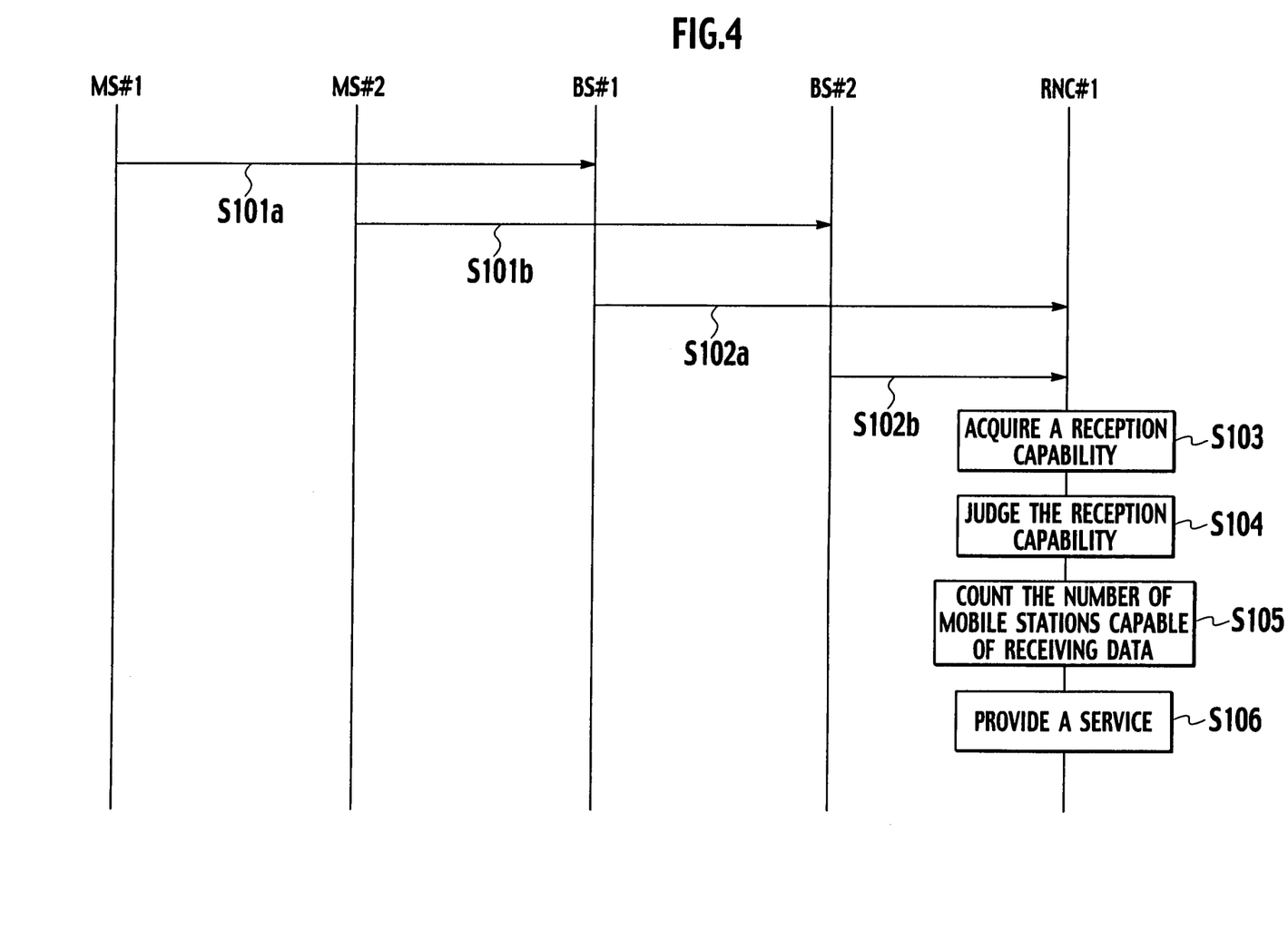
FIG. 4 is a sequence diagram showing an operation of the radio communications system according to the first embodiment.

Referring to FIG. 4, an operation of the radio communications system according to the first embodiment will be described.

In an example of FIG. 4, the operation of when the radio communications system according to the first embodiment measures the reception-capable mobile station number in the location registration area #1.

As shown in FIG. 4, in step 101a, the mobile station MS #1 located in the cell #1 transmits the location registration information to the base station BS #1 which controls the cell #1.

In step 101b, the mobile station MS #2 located in the cell #2 transmits the location registration information to the base station BS #2 which controls the cell #2.

Here, the mobile stations MSs #1 and #2 can be configured to transmit the location registration information periodically, for example, every 1 minute or 30 minutes.

In step 102a, the base station BS #1 transfers the location registration information from the mobile station MS #1 to the radio network controller RNC #1.

In step 102b, the base station BS #2 transfers the location registration information from the mobile station MS #2 to the radio network controller RNC #1.

In step 103, the radio network controller RNC #1 receives the location registration information of the mobile stations MSs #1 and #2 transferred from the base stations BSs #1 and #2, and acquires the reception capabilities of the mobile stations MSs #1 and #2 from the location registration information of the mobile stations MSs #1 and #2.

In step 104, the radio network controller RNC #1 judges whether the mobile stations MSs #1 and #2 can receive the broadcast data or the multicast data or not, in accordance with the location registration information of the mobile stations MSs #1 and #2 and the reception capabilities of the mobile stations MSs #1 and #2.

In the first embodiment, the radio network controller RNC #1 judges that the mobile station MS #1 can receive the multicast data, and that the mobile station MS #2 can not receive neither the broadcast data nor the multicast data.

In step 105, the radio network controller RNC #1 measures the number of the mobile stations MSs capable of receiving broadcast data or multicast data (the reception-capable mobile station number) in the location registration area #1. In the first embodiment, the reception-capable mobile station number is "1".

In step 106, since the reception-capable mobile station number is smaller than the first predetermined number (for example, "5"), the radio network controller RNC #1 transmits the broadcast data or the multicast data to the mobile station MS #1 located in the location registration area #1 using the dedicated channels.

<Functions and Effects of the Radio Communications System According to the First Embodiment>

The radio communications system according to the first embodiment can measure the number of the mobile stations MSs capable of receiving broadcast data or multicast data (the reception-capable mobile station number), so as to provide services according to the reception-capable mobile station number with the mobile stations MSs.

<A Radio Communications System According to a Second Embodiment of the Present Invention>

Figure 5:
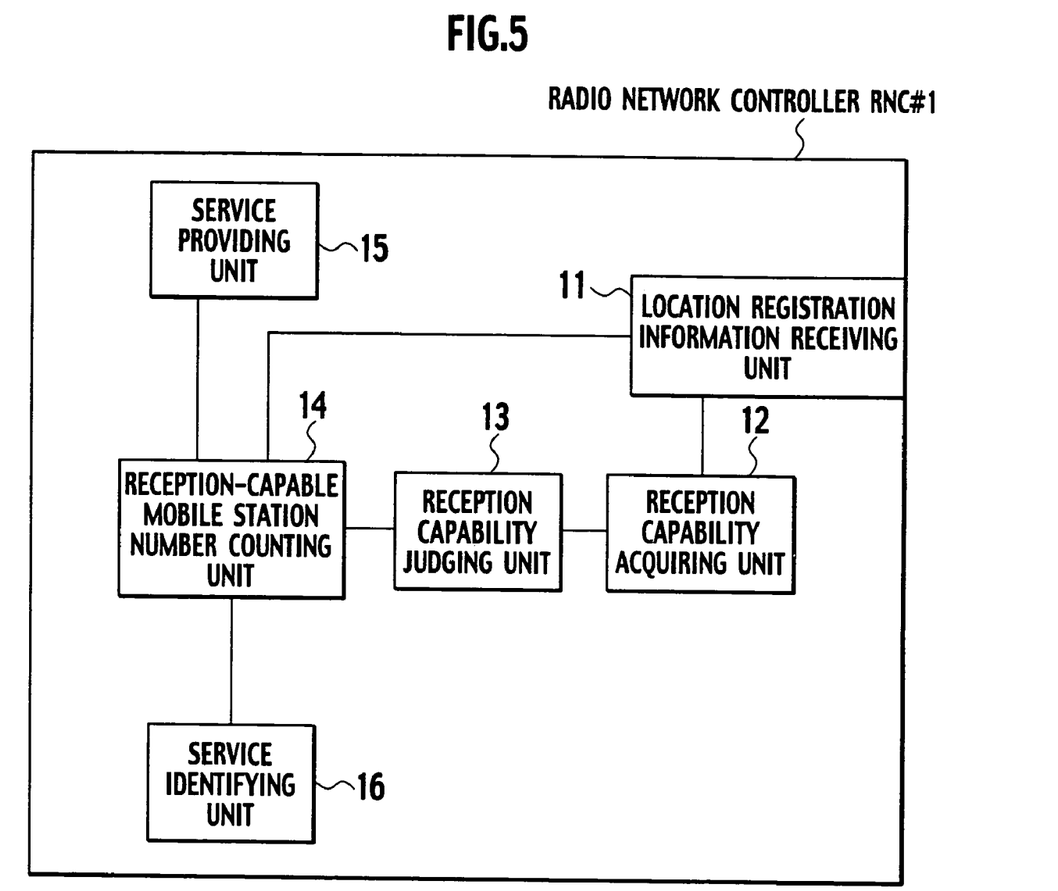
FIG. 5 is a functional block diagram of a radio network controller according to the second embodiment.

Referring to FIG. 5, a radio communications system according to a second embodiment of the present invention will be described. Hereinafter, the difference between the radio communications system according to the first embodiment and the radio communications system according to the second embodiment will be described mainly.

As shown in FIG. 5, a radio network controller RNC which is one element of the radio communications system according to the second embodiment includes a service identifying unit 16, in addition to the functions of the radio communications system according to the first embodiment.

The service identifying unit 16 is configured to judge whether the mobile station MS can receive the broadcast data in the location registration area #1 or not, and whether the mobile station MS can receive the multicast data in the location registration area #1 or not, in accordance with the location registration information received by the location registration information receiving unit 11 and the reception capability of the mobile station MS acquired by the reception capability acquiring unit 12.

The service identifying unit 16 can be configured to manage information of the mobile station MS capable of receiving the broadcast data and information of the mobile station MS capable of receiving the multicast data, and judge whether the mobile station MS can receive the broadcast data in the location registration area #1 or not, and whether the mobile station MS can receive the multicast data in the location registration area #1 or not, in accordance with the location registration information received by the location registration information receiving unit 11.

The reception-capable mobile station number counting unit 14 is configured to measure the number of the mobile stations capable of receiving the broadcast data and the number of the mobile stations capable of receiving the multicast data respectively, in accordance with a result judged by the service identifying unit 16.

The service providing unit 15 is configured to provide a broadcast service in accordance with the number of the mobile stations capable of receiving the broadcast data, and to provide a multicast service in accordance with the number of the mobile stations capable of receiving the multicast data.

For example, the service providing unit 15 can determine to transmit the broadcast data using the dedicated channels, to transmit the broadcast data using the common channels, or not to transmit the broadcast data, in accordance with the number of the mobile stations capable of receiving the broadcast data measured by the reception-capable mobile station number counting unit 14.

Furthermore, the service providing unit 15 can determine to transmit the multicast data using the dedicated channels, to transmit the multicast data using the common channels, or not to transmit the multicast data, in accordance with the number of the mobile stations capable of receiving the multicast data measured by the reception-capable mobile station number counting unit 14.

The service providing unit 15 can determine to transmit the broadcast data or the multicast data using the dedicated channels, to transmit the broadcast data or the multicast data using the common channels, or to transmit neither the broadcast data nor the multicast data, in consideration with a probability that the mobile station MS located in a predetermined location registration area can receive the broadcast data or the multicast data.

For example, when the probability that the mobile station MS located in a predetermined location registration area #1 can receive the broadcast data or the multicast data in more that or equal to 50%, and when the above reception-capable mobile station number is more than twice the first predetermined number (for example, "100"), the service providing unit 15 can be configured to transmit the broadcast data or the multicast data using the common channels.

Otherwise, the service providing unit 15 can be configured to transmit the broadcast data or the multicast data using the dedicated channels, or to transmit neither the broadcast data nor the multicast data.

Figure 6:
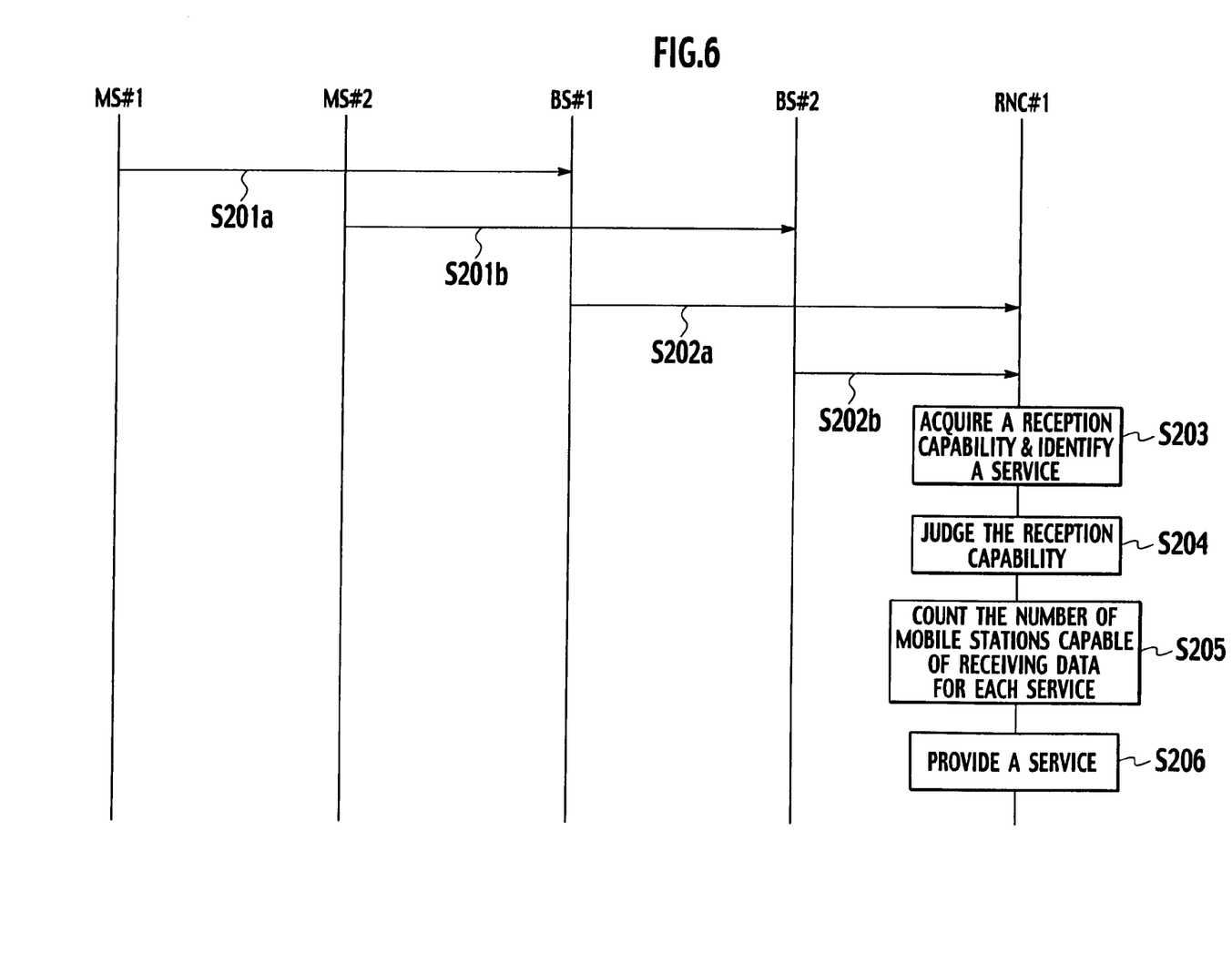
FIG. 6 is a sequence diagram showing an operation of the radio communications system according to the second embodiment.

Referring to FIG. 6, an operation of the radio communications system according to the second embodiment will be described.

In an example of FIG. 6, the operation of when the radio communications system according to the second embodiment measures the reception-capable mobile station number in the location registration area #1.

Operations of steps 201a to 203 shown in FIG. 6 are same as the operations of steps 101a to 103 shown in FIG. 4 respectively.

In step 204, the radio network controller RNC #1 judges whether the mobile stations MSs #1 and #2 can receive the broadcast data or not, and whether the mobile stations MSs #1 and #2 can receive the multicast data or not, in accordance with the location registration information and the reception capabilities of the mobile stations MS #1 and #2.

In step 205, the radio network controller RNC #1 measures the number of the mobile stations capable of receiving the broadcast data in the location registration area #1, and the number of the mobile stations capable of receiving the multicast data in the location registration area #1.

In step 206, the radio network controller RNC #1 provides the broadcast service in accordance with the number of the mobile stations capable of receiving the broadcast data, and provides the multicast service in accordance with the number of the mobile stations capable of receiving the multicast data.

The present invention can provide a radio communications method and a radio network controller which measure the number of the mobile stations capable of receiving broadcast data or multicast data, so as to provide services according to the number of the mobile stations.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A radio network controller which controls a location registration area which is formed by a plurality of cells, the radio network controller comprising:

a location registration information receiver configured to receive a location registration information for registering a mobile station in the location registration area;

a reception capability acquirer configured to acquire a reception capability of the mobile station; and a measurer configured to measure the number of the mobile stations capable of receiving broadcast data or multicast data in the location registration area, in accordance with the location registration information and the reception capability.

2. A radio network controller which controls a location registration area which is formed by a plurality of cells, the radio network controller comprising:

a location registration information receiver configured to receive a location registration information for registering a mobile station in the location registration area; and a measurer configured to measure the number of the mobile stations capable of receiving broadcast data or multicast data in the location registration area, in accordance with the location registration information.

3. A radio communications method for communicating between a radio network controller which controls a location registration area and a mobile station located in the location registration area, the location registration area being formed by a plurality of cells, the method comprising:

transmitting, at the mobile station, a location registration information for registering the mobile station in the location registration area, at a predetermined timing;

acquiring, at the radio network controller, a reception capability of the mobile station; and measuring, at the radio network controller, the number of the mobile stations capable of receiving broadcast data or multicast data in the location registration area, in accordance with the location registration information and the reception capability.

4. A radio communications method for communicating between a radio network controller which controls a location registration area and a mobile station located in the location registration area, the location registration area being formed by a plurality of cells, the method comprising:

transmitting, at the mobile station, a location registration information for registering the mobile station in the location registration area, at a predetermined timing; and measuring, at the radio network controller, the number of the mobile stations capable of receiving broadcast data or multicast data in the location registration area, in accordance with the location registration information.

* * * * *